United States Patent
Lecea et al.

(10) Patent No.: US 7,370,672 B2
(45) Date of Patent: May 13, 2008

(54) DIVERTER VALVE

(75) Inventors: Oscar A. Lecea, Grand Blanc, MI (US); Elwood W. Wingeier, Orion, MI (US); James M. Ciosek, Davison, MI (US); David A. Goulette, Marine City, MI (US)

(73) Assignee: Delphi Technologies, Inc., Troy, MI (US)

( * ) Notice: Subject to any disclaimer, the term of this patent is extended or adjusted under 35 U.S.C. 154(b) by 396 days.

(21) Appl. No.: 11/034,407

(22) Filed: Jan. 12, 2005

(65) Prior Publication Data
US 2006/0151028 A1    Jul. 13, 2006

(51) Int. Cl.
F16K 11/06    (2006.01)
(52) U.S. Cl. .................. 137/625.46; 137/340
(58) Field of Classification Search ............... 137/340, 137/625.46, 625.47, 375
See application file for complete search history.

(56) References Cited

U.S. PATENT DOCUMENTS

| | | | | |
|---|---|---|---|---|
| 3,752,167 A | * | 8/1973 | Makabe | 137/625.41 |
| 4,224,958 A | * | 9/1980 | Kaplan et al. | 137/340 |
| 4,562,748 A | * | 1/1986 | Mrochek et al. | 73/863.73 |
| 4,583,570 A | * | 4/1986 | Rabe | 137/340 |
| 4,697,615 A | * | 10/1987 | Tsuchimoto et al. | 137/340 |
| 4,777,013 A | * | 10/1988 | Wolters et al. | 376/283 |
| 4,964,436 A | * | 10/1990 | Hein | 137/625.47 |
| 5,762,099 A | * | 6/1998 | Croucamp et al. | 137/340 |
| 6,105,559 A | | 8/2000 | Stoltman | |
| 6,155,298 A | * | 12/2000 | Aigami | 137/625.47 |
| 6,729,350 B2 | * | 5/2004 | Schick | 137/625.46 |
| 6,889,710 B2 | * | 5/2005 | Wagner | 137/625.46 |
| 6,932,112 B2 | * | 8/2005 | Bradford et al. | 137/625.11 |
| 2001/0049043 A1 | | 12/2001 | Bircann et al. | |
| 2002/0029522 A1 | | 3/2002 | Abe | |

* cited by examiner

Primary Examiner—John Fox
(74) Attorney, Agent, or Firm—Paul L. Marshall

(57) ABSTRACT

A diverter valve is disclosed and may comprise an actively cooled valve actuation section, an actuator, and a valve section comprising a rotationally actuated valve plate that is structured to be rotationally actuated by the actuator to direct flow wherein the actuation section may be thermally insulated from the valve actuation section.

9 Claims, 4 Drawing Sheets

DIVERTER VALVE

BACKGROUND

The advent of fuel cells as alternative propulsion systems or auxiliary power units (APU's) for automotive and other similar applications, and the advent of advanced engines having capability for lower emissions and better fuel efficiency, have created a need for improved and highly specialized gas flow control valves. This includes diesel fuel reformate valves which may be used with APU fuel cells for example, or to provide $No_x$ reductants for emissions control in advanced diesel engines, or for other uses. A reformer or fuel processor, can convert a hydrocarbon fuel (e.g., methane, propane, natural gas, gasoline, diesel, oxygenated hydrocarbons, and the like) to hydrogen or to a less complex hydrocarbon. More particularly, fuel reforming can comprise mixing a hydrocarbon fuel with air, water, and/or steam in a mixing zone of the reformer prior to entering a reforming zone of the reformer, and converting the hydrocarbon fuel into, for example, hydrogen ($H_2$), byproducts (e.g., carbon monoxide (CO), methane ($CH_4$), inert materials (e.g., nitrogen ($N_2$), carbon dioxide ($CO_2$), and water ($H_2O$)). Also, fuel cells for example are known to use hydrogen gas as an energetic fuel for exothermic combination with oxygen at high temperature. Hydrogen may be supplied continuously to a fuel cell as a "reformate" product. At start-up of the reformer, however, the reformer operating temperature typically is too low for production of a satisfactory percentage of hydrogen in the reformate. Therefore, until the reformer achieves a sufficiently high temperature, the fuel cell is typically not started and the reformate output is diverted to a waste burner rather than being simply discharged to the atmosphere. As the percentage of hydrogen in the reformate increases, the reformate output stream is diverted away from the burner by a diverter valve and to the fuel cell. Sensitive control of such diversion is highly important to satisfactory operation of the fuel cell. Additionally, regarding emissions technology, Hydrogen reformate may need to be directed to a Diesel Particulate Filter (DPF), trap (DNT), or other device.

However, rigorous requirements must also be met by these diverter valves. The requirements of such valves, including material properties, would include capability to operate at very high temperatures and in corrosive environments with a minimum tolerance for leakage. Degradation of materials resulting from sustained exposure to such conditions can diminish valve performance significantly, leading ultimately to valve and system failure. Some components of prior art valves, such as force-balancing springs, may experience appreciable set or relaxation at high temperatures, rendering them useless. Additionally, their working lifetimes may be significantly shortened. Operating at such high temperatures can cause excessive linear expansion and failure in critical elements, rendering gas metering inaccurate or impossible.

Additionally, many valve designs are impractical for automotive applications due to excessive size, prohibitive cost, slow response, and required actuation force. The cost of some prior art valves can approach or exceed the targeted cost of the entire vehicle reformer system for which a flow-control valve is intended. For at least these reasons, prior art valves are not suitable for automotive applications for example.

What is needed is a sectional gas flow control valve assembly having valve section components which can withstand extremely high operating temperatures (for example 600°-900° C.), and having actuating section components which can operate in moderately high temperatures (for example 100°-150° C.). Thus, insulating seals and/or structures for thermally isolating the valve section components from the actuating section components are needed. It is also desirable for the valve section to be self-cleaning in order to clean debris or soot which could inhibit the actuation of the valve causing the valve to remain stuck in an open or closed position. Depending upon the application, such a valve assembly could be relatively small and lightweight, inexpensive to manufacture, highly reliable, and virtually leak-proof. A design which is also self-cleaning and thus not prone to malfunction due to being clogged with debris or soot is also desirable.

SUMMARY OF THE INVENTION

A diverter valve is disclosed and may comprise an actively cooled valve actuation section, an actuator, and a valve section comprising a rotationally actuated valve plate that is structured to be rotationally actuated by the actuator to direct flow wherein the actuation section may be thermally insulated from the valve actuation section.

BRIEF DESCIPTION OF THE FIGURES

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

For purposes of introduction it is first noted that in FIGS. 1-4 a high temperature valve 1 is disclosed which includes two sections, a valve section 39 and a valve actuation section 40. The valve section 39 includes a rotatable ceramic plate 3 which is self-cleaning of debris or deposits. This is in contrast to use of a vertical plunger movement to open valve 1 for example. The valve actuation section 40 is thermally protected from the higher temperature valve section 39 and the valve actuation section 40 is also actively cooled. Ceramics are extensively used, particulary in the high temperature areas. Any springs included are used in the valve actuation section and are therefore located remotely from the higher temperature valve section 39.

Figure 1:
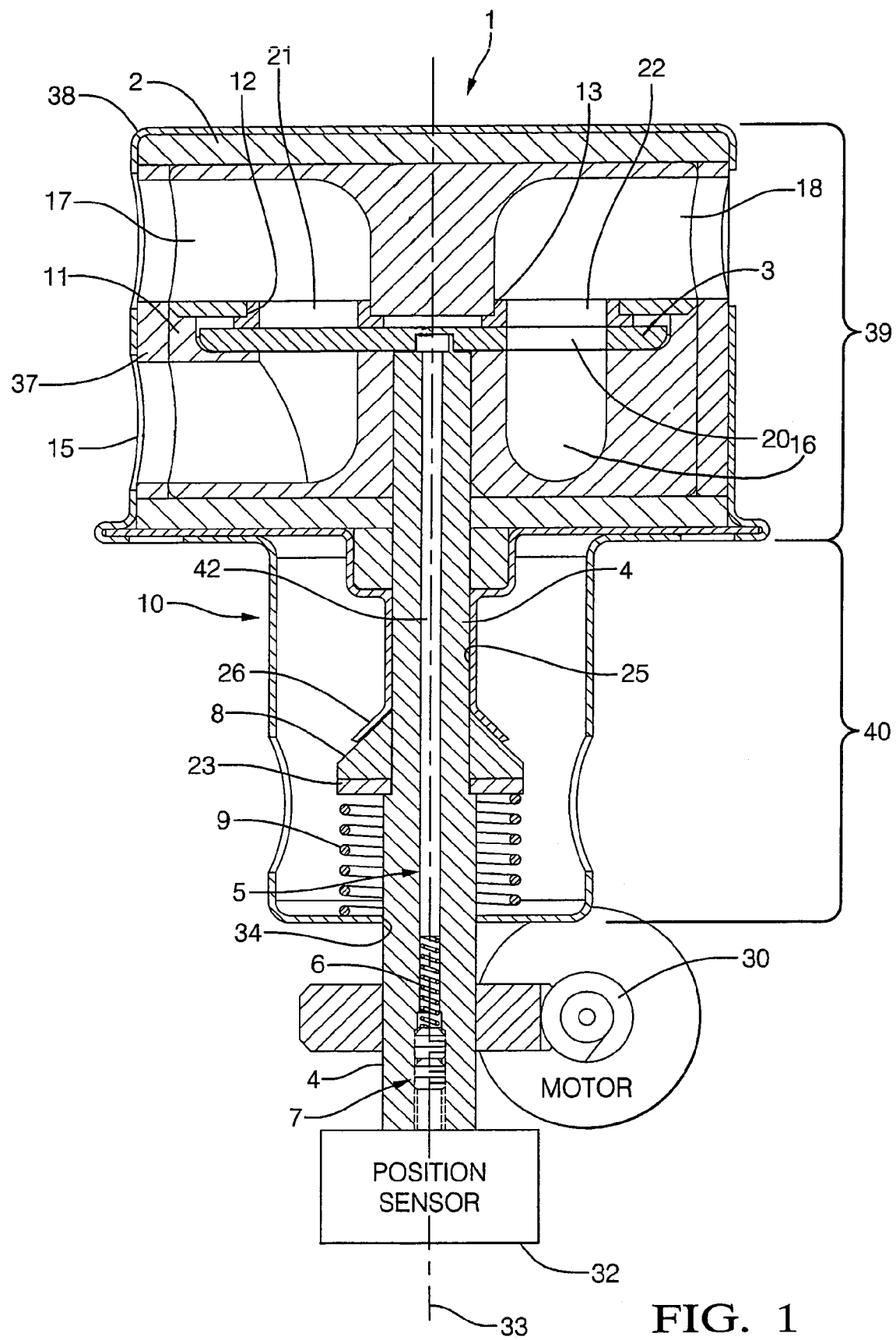
FIG. 1 is a cross sectional view of an embodiment.
Figure 2:
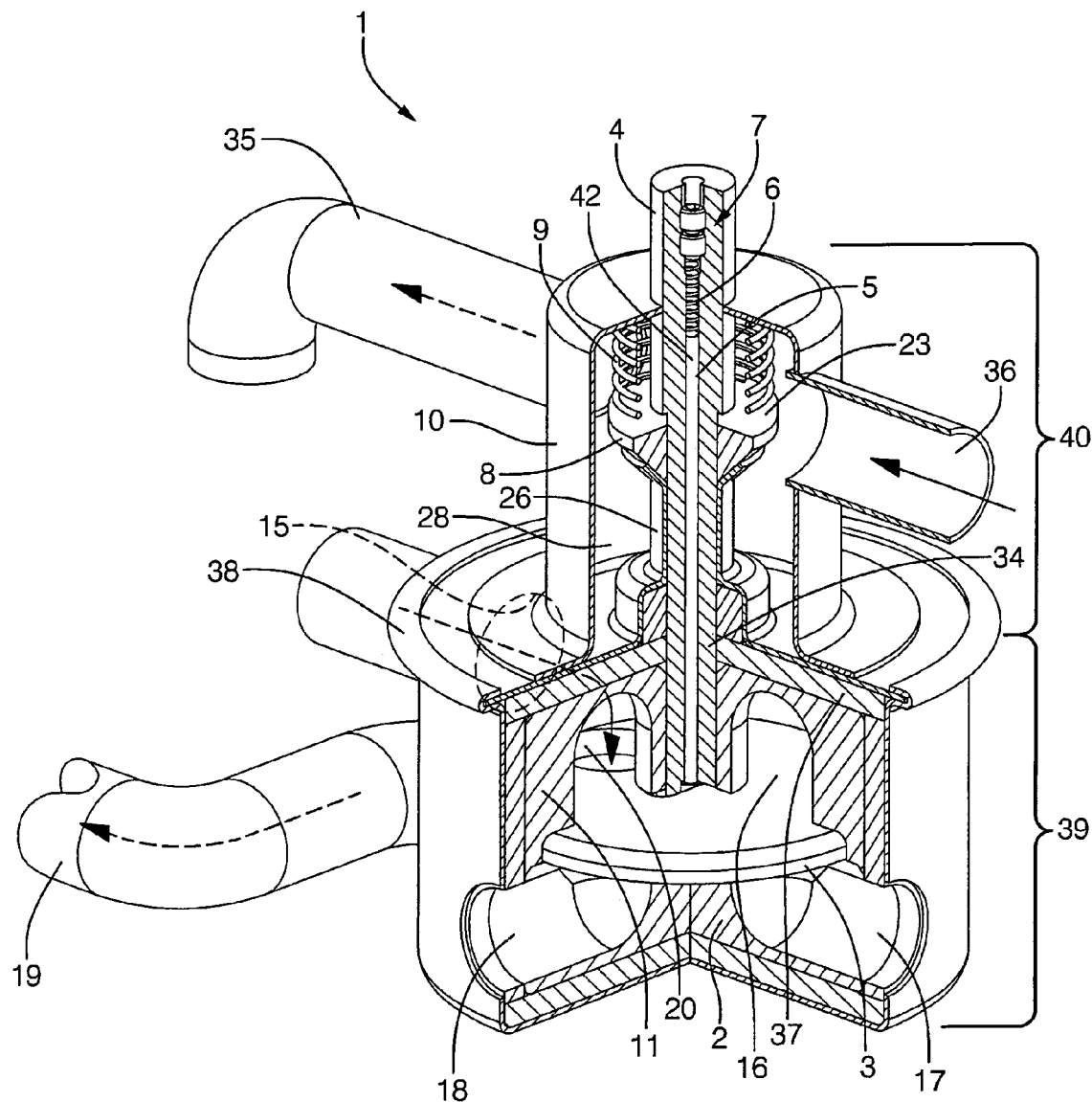
FIG. 2 is a cut away perspective view of an embodiment in a first position.
Figure 3:
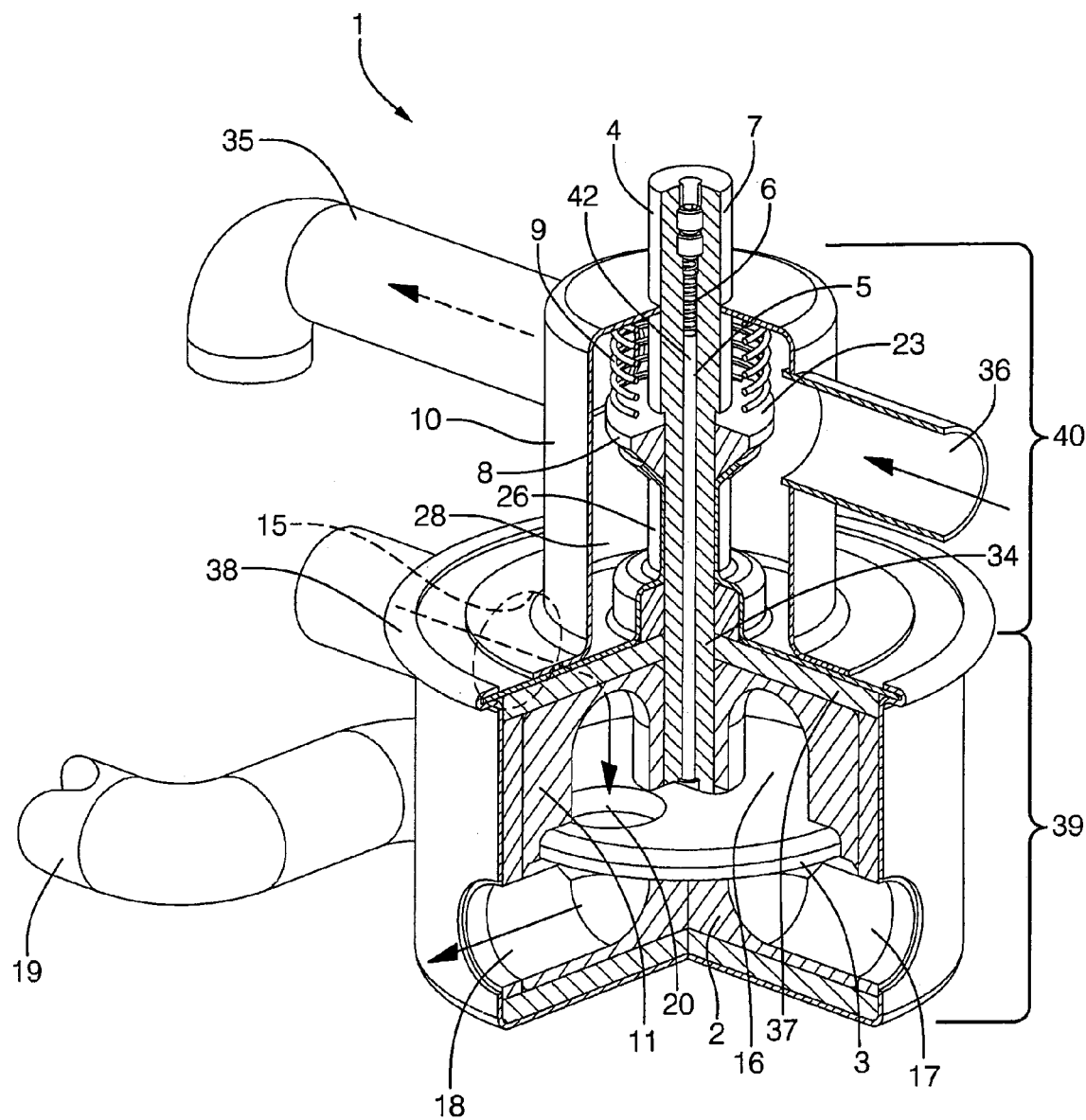
FIG. 3 is a cut away perspective view of an embodiment in a second position.
Figure 4:
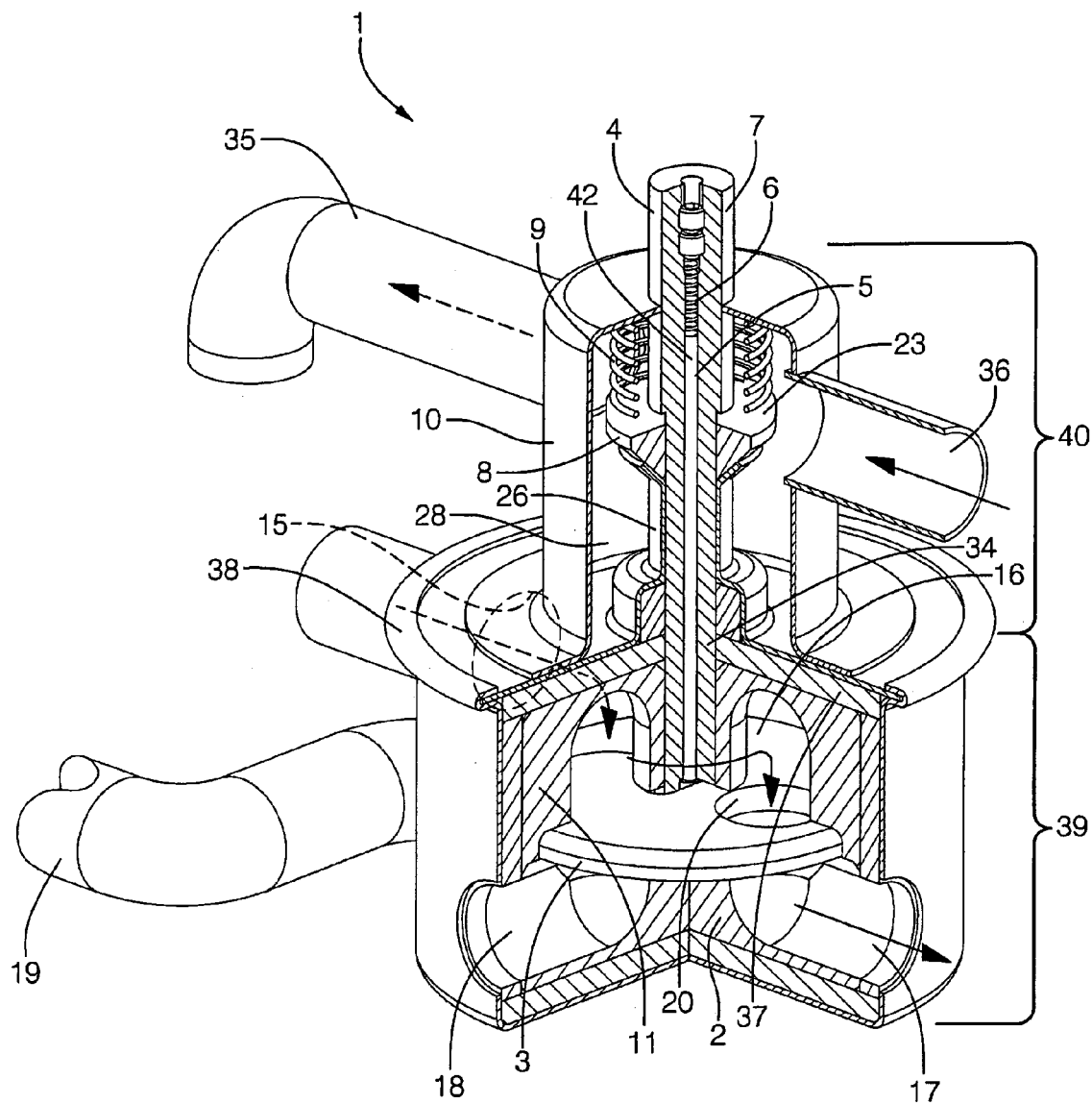
FIG. 4 is a cut away perspective view of an embodiment in a third position.

More specifically, referring to FIGS. 1-4, an embodiment of the valve 1 is shown. The valve 1 may comprise a chamber housing 11 that may be made of ceramic for example. In this embodiment, the ceramic components may include alumina, mullite, steatite or other materials. As best seen in FIGS. 2-4, the chamber housing 11 is surrounded by a region of mat material 37 which acts like a thermal spring material to compensate for thermal expansion. Surrounding the mat material 37 may be an outer shell 38 which may be made of 409 stainless steel or other material for example. A premium mat material 37 without mica may be used in order to prevent mat erosion from allowing mica to be carried downstream.

The chamber housing 11 has a shaft opening 25 in which shaft 4 is located along a central rotational axis 33. In this embodiment, the shaft 4 may be made of 300 series stainless steel, inconel, or another material. The chamber housing 11 also has an inlet port 15 located on its circumference that allows gases or fluid to enter. The chamber housing 11 is mated to a ceramic base 2 to form a chamber 16. The ceramic base 2 has two or more outlet ports (17, 18) formed within it which are connected to the chamber 16 by openings (21, 22) located in the ceramic base 2. Additional ceramic seals 12, 13 may also be located about these openings (21, 22) respectively, if desired.

As is best seen by comparing the flow arrows in FIGS. 2-4 to each other, in order to control the flow of gases or fluids to the outlet ports (17, 18,) valve 1 has three outlet ports in FIGS. 2-4 shown in three positions for flow to the three ports. The outlet port pipe 19 in FIGS. 2-4 connects to the third outlet port (not shown). It is noted that any suitable number of outlet ports is possible depending upon the application. Rotatable ceramic plate 3 is also provided with holes or aperatures 20 and rotates about the central axis 33. In this embodiment, one aperture 20 is provided although it is contemplated that more than one aperture may also be provided in an alternative embodiment The rotatable ceramic plate 3 is rotated by shaft 4 which may be connected for example to a worm gear 30 which in turn may be connected to an electric motor (not shown) or other turning or actuating means.

As is shown in the figures, the rotatable ceramic plate 3 is structured so that at least one included aperature 20 is of similar size and/or diameter as openings (21, 22) located in the ceramic base 2. As the openings (21, 22) lead to outlet ports (17, 19), the rotatable ceramic plate 3 with aperature 20 acts as a valve opening and closing device. Thus, shaft 4 mounted on central axis 33 of plate 3 in an indent 34 for example serves as a pivot point so that rotatable ceramic plate 3 becomes an index-able device for controlling the flow from the chamber 16 to the selected output ports (17, 18) in ceramic base 2. Thus, the shaft 4 is structured to engage with rotatable ceramic plate 3 so that when the shaft 4 is turned, the rotatable ceramic plate 3 will turn with it. However, the shaft and the rotatable ceramic plate 3 are free to move independently of each other along the shaft central axis 33.

The shaft 4 also has a channel 42 extending through its length with the end opposite rotatable ceramic plate 3 being tapped for a screw 7. A smaller shaft or rod 5 is located in the channel 42 in shaft (4). In this embodiment, the rod 5 may be made of 300 series stainless steel, inconel, or another material. During final assembly, a rod spring 6 is introduced in the threaded end of channel 42 after the rod 5 has been inserted. A screw 7 is used to retain the spring 6 and rod 5. This shaft 4 and rod 5 assembly is mounted in such a way that the rod 5 applies pressure on rotatable ceramic plate 3 thus forcing it towards ceramic base 2. The pressure is set by the amount of compression that is applied to the rod spring 6 by the screw 7. Shaft 4 is located in shaft opening 25 of the chamber housing 11. Additionally, raised boss 26 is located in chamber housing 11 proximate to shaft opening 25. This forms a bearing surface for rotation of the shaft 4 and rotatable ceramic plate 3 so that rotatable ceramic plate 3 becomes an index-able device for controlling the flow from the chamber 16 to the selected output ports (17, 18) in the ceramic base 2. A position sensor 32 may be included to monitor the position of shaft 4. The raised boss 26 may be a conical or spherical section and is aligned with the shaft opening. In this embodiment, a cone 8 or sphere with the shaft 4 located there through and matching the raised boss 26 is made from a low friction, high temperature, sealing material, for example ceramic, alumina, mullite, steatite, graphite or other material. The cone 8 or sphere is trapped between a flange 23 on the shaft and the raised boss 26 by a seal spring 9. This creates a thermal seal and a seal preventing flow from the chamber 16 past the shaft 4 to atmosphere. A sheet metal cup 10 with a central opening 34 for the shaft 4 is used to compress the seal spring 9 and is mated to chamber housing 11.

As shown in FIG. 1, the valve 1 does not have a sliding valve stem or plunger. Instead it uses rotational activation that is not affected by deposits on the valve actuation shaft 4. Also, this design has features which allow the ceramic seals (12, 13) surfaces to be self cleaning, as the rotatable ceramic plate 3 rotates the ceramic seals (12, 13) surfaces on the ceramic base 2 self-clean or wipe off contamination deposits such as soot from reformate.

The advantages of using ceramic materials is that they are light, easily molded, and capable of surviving extended thermal excursions beyond design temperatures. The valve 1 design as a whole allows for simple assembly where for example the ceramic components are wrapped in ceramic mat material used in catalytic converters, then placed into a sheet metal cup 10. This is a proven technique to support ceramic components and allows for maintaining a gas tight seal during thermal expansion and contraction. The sheet metal cup may be made of 409 stainless steel or other material for example.

Additionally, as best seen in FIGS. 2-4, the valve 1 is structured to include a biasing device which in this embodiment comprises springs (6, 9) which are located in such a way as to be thermally protected and also located to be cooled by air (see flow arrows) being fed through an attached air pipe 35 to the reformer (not shown) for combustion. The air coming from an air compressor (not shown) is sent through the air pipe 36 to spring compartment 28 of the valve 1 before going on to the exit air pipe 35 and the reformer inlet (not shown). Also, the springs are located remotely from the components exposed to the hot gases. Thus, the valve 1 structures described above provide thermal protection and isolation from the chamber 16 which contains materials at high temperatures and allows the springs (6, 9) to avoid being adversely affected or prematurely worn out due to the high temperatures present in chamber 16. Thus, in this embodiment, the springs may operate in moderately high temperatures, for example about 100°-150° C., while the chamber 16 may operate at higher temperatures, for example, 600-900° C. In other words, the distance between the springs and the reformate passages or chamber 16 and the use of ceramic mat material located around the ceramic valve components reduces the temperature that the springs are exposed to. This prevents damage to the springs (6, 9).

Thus, the valve 1 is designed so that the air being fed into the reformer passes through the top (spring end) of the valve 1 before going into the reformer (not shown). This allows for a number of benefits. For example, in this embodiment, the inlet air may for example be at less than 100° C. and a volume of 20 grams/sec., thus cooling the valve actuation section 40. For example, in this embodiment the valve actuation section 40 is typically operating in the range of 100° to 150° C.

This feature also allows for a very low pressure differential across the high temperature valve sealing components, thus making the valve easier to seal. Also, any leakage across the seal formed in the region of cone 8 will be fed back into the reformer preventing leakage to atmosphere of high concentrations of $H_2$ and CO, both of which are very dangerous.

While the preferred embodiment to the invention has been described, it will be understood that those skilled in the art, both now and in the future, may make various improvements and enhancements which fall within the scope of the claims which follow.

The invention claimed is:

1. A valve apparatus comprising:
   a) a shaft;
   b) a valve section comprising:
   a ceramic chamber housing;
   a ceramic mat material located externally to the chamber housing;
   a ceramic base adjoining the chamber housing to enclose a chamber;
   a shaft opening located through the chamber housing;
   a thermally insulating seal located between the shaft opening and the chamber housing;
   an inlet port located in the chamber housing;
   outlet ports located in the ceramic base;
   a rotatable ceramic plate located between the chamber housing and the ceramic base having at least one aperture and being rotatable by the shaft in order to move the aperture relative to the output ports and being rotatable by the shaft in order to self clean the rotatable ceramic plate by rotation about the ceramic base; and
   c) a valve actuation section comprising:
   at least one biasing device connected to the shaft; and
   cooling ports located in the valve actuation section for thermally cooling the valve actuation section and the biasing device.

2. The valve of claim 1 wherein is the valve section is formed of materials suitable for operation at temperatures up to about 900° C.

3. The valve of claim 1 wherein the cooling ports in the valve actuation section are structured to regulate the temperature in the valve actuation section to a temperature up to about 150° C.

4. The valve of claim 1 further comprising an outer shell located over the ceramic mat material.

5. The valve of claim 4 wherein the biasing device includes at least one spring for biasing the shaft against the ceramic plate.

6. The valve of claim 4 wherein the shaft includes an internal channel and an adjustably biased rod located within the channel which contacts the rotatable ceramic plate in order to additionally bias the rotatable ceramic plate towards the ceramic base.

7. The valve of claim 6 wherein a rod spring is located to bias the rod towards the ceramic plate.

8. The valve of claim 2 wherein the materials suitable for operation at temperatures up to about 900° C. may include materials from the group consisting of ceramic, alumina, mullite, or steatite.

9. The valve of claim 1 further comprising ceramic seals located at the outlet ports between the rotatable ceramic plate and the ceramic base.

* * * * *